United States Patent [19]

La Russa

[11] 3,898,701
[45] Aug. 12, 1975

[54] IMPLANTABLE HEART VALVE

[76] Inventor: Joseph La Russa, 451 Rutledge Dr., Yorktown Heights, N.Y. 10598

[22] Filed: Jan. 17, 1974

[21] Appl. No.: 434,321

[52] U.S. Cl. ............. 3/1.5; 137/512.15; 137/525.1
[51] Int. Cl. ............................................ A61f 1/22
[58] Field of Search ..................... 3/1, DIG. 3, 1.5; 137/512.1, 512.15, 512.4, 525, 525.1

[56] References Cited
UNITED STATES PATENTS

| | | | |
|---|---|---|---|
| 2,897,828 | 8/1959 | Bender | 137/512.15 X |
| 3,279,996 | 10/1966 | Long, Jr. et al. | 3/DIG. 3 |
| 3,416,562 | 12/1968 | Freeman | 3/1 X |
| 3,551,913 | 1/1971 | Shiley | 3/1 |
| 3,571,815 | 3/1971 | Somyk | 3/1 |

FOREIGN PATENTS OR APPLICATIONS

| | | | |
|---|---|---|---|
| 958,889 | 2/1957 | Germany | 137/525.1 |
| 1,016,811 | 1/1966 | United Kingdom | 3/DIG. 3 |

Primary Examiner—Ronald L. Frinks
Attorney, Agent, or Firm—Burgess, Dinklage & Sprung

[57] ABSTRACT

An implantable heart valve is disclosed and includes a flattened, flexible tubular body preferably made of silicone rubber, an annular spacing member inserted into and opening the upstream end of the tubular body, the downstream end of the body forming a flap valve with inner working surfaces that contact each other when the valve is closed and move apart when the valve is opened, and an anti-inversion separator carried by the annular spacing member and extending into the tubular body and between the working surfaces thereof such that a portion of the working surfaces contact the anti-inversion separator when the valve is closed. Additional embodiments include a suturing sleeve attached to the upstream end of the tubular body and a stiff shroud surrounding the tubular body and attached thereto at the upstream end.

5 Claims, 6 Drawing Figures

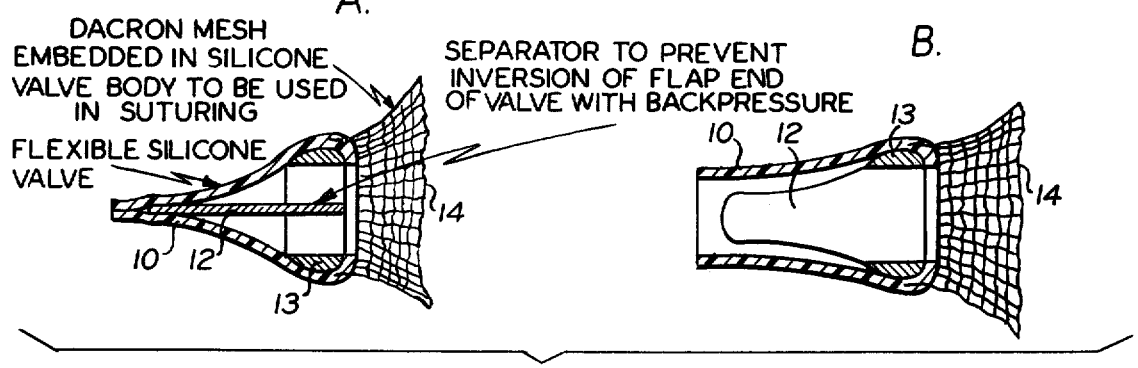
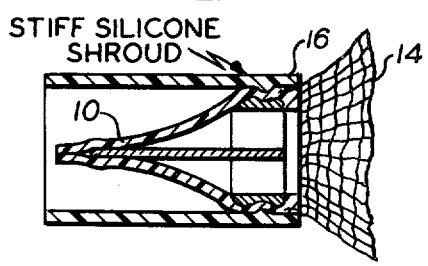
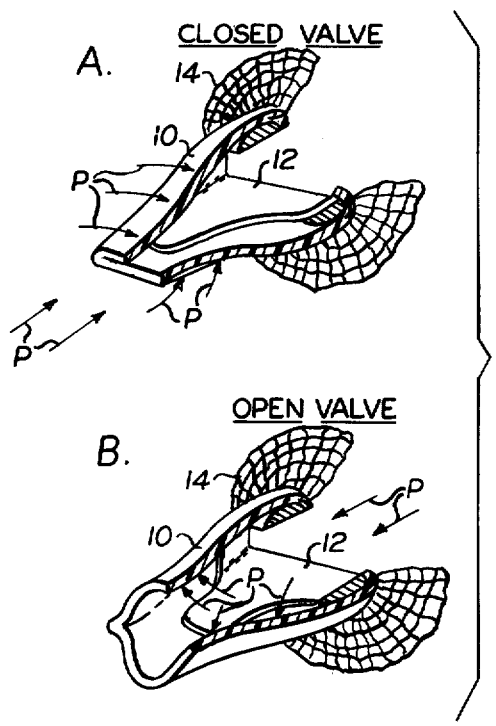
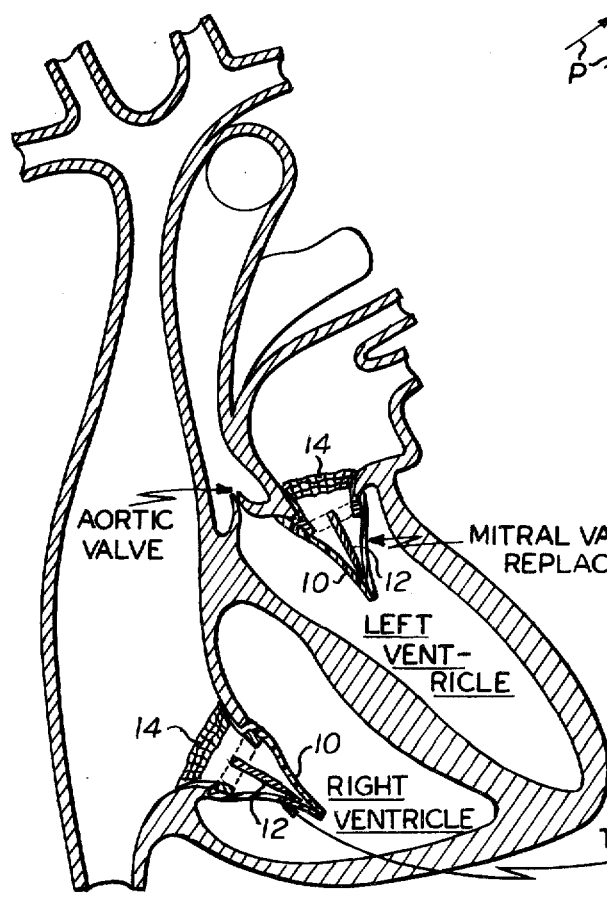

IMPLANTABLE HEART VALVE

BACKGROUND

This invention relates to an implantable heart valve which is manufactured of flexible material and can be sutured directly into the heart. More particularly, this invention relates to a heart valve which completely eliminates any high pressure contact areas between the operating portions of the valve. The heart valve of the invention is noise free, has no independently moving parts, is pliable and operates with a minimum differential and pressure. The flexing or contacting inner working surfaces of the valve do not rub against each other making wear practically non-existent.

Many heart valves which can be implanted into the human heart are known. One such heart valve includes a ball and seat device wherein the ball is restrained in a cage-like affair. In opening and closing the valve, erosion of the valve surfaces occur because of the relative motion between the independently moving ball and the valve seat. Additional valve wear is also caused by the higher pressures that exist at the contact surface between the ball and seat of the valve. If valves of this type do not wear uniformly, that is, both with respect to the ball and the seat of the valve, the sphericity of the ball is destroyed and/or the uniformity of seating. Obviously, this can adversely affect proper closing of the valve. The higher pressures existing between the ball and the seat of the valve contact area destroys some of the blood cells with each opening and closing of the valve. The higher pressure between the contacting surfaces of this type of valve is due to the fact that the blood pressure exerted over the projected area of the ball is concentrated into a higher force over the smaller area of contact between the ball and seat.

Flexible valves have been proposed as replacements for the ball and seat type of heart valve. Typical heart valves with flexible valve members are shown, for example, in U.S. Pat. Nos. 2,682,057 issued June 29, 1954, 2,832,078 issued Apr. 29, 1958, 3,113,586 issued Dec. 10, 1963, 3,320,972 issued May 23, 1967, 3,579,642 issued May 25, 1971 and 3,589,392 issued June 29, 1971. Similar and related heart valve constructions are described in U.S. Pat. Nos. 3,378,029 issued Apr. 16, 1968, 3,513,485 issued May 26, 1970, 3,548,417 issued Dec. 22, 1970, 3,689,942 issued Sept. 12, 1972 and 3,755,823 issued Sept. 4, 1973. Such heart valves, however, as typified by these patents, are complex in construction, delicate and intricate in operation and are generally expensive to manufacture.

SUMMARY

The present invention provides an implantable heart valve which has a longer life as compared to prior heart valve constructions, is more quiet in operation, operates in a more positive fashion under minimal pressure differentials, seals more completely when closed, opens more readily, and never damages the blood cells because the maximum pressure between the closing surfaces of the valve cannot exceed the existing blood pressure. The heart valve of the invention thus eliminates shearing and other stresses, a flaw in past heart valve designs which can damage blood cells.

The implantable heart valve of the invention includes the following:

a. a flattened, flexible tubular body;

b. spacing means inserted into and opening the upstream end of the tubular body, the downstream end of the tubular body forming a flap valve with inner working surfaces that contact each other when the valve is closed and move apart when the valve is opened; and c. anti-inversion means extending into the tubular body between the working surfaces thereof such that a portion of the working surfaces contact the anti-inversion means when the valve is closed.

Preferred embodiments of the heart valve of the invention include an annular member for the spacing means and a centrally positioned, flat, tongue-like member carried by the annular member as the anti-inversion means. The tongue-like member preferably decreases in width towards the downstream end of the tubular body and ends short of the downstream end such that the inner working surfaces of the flap valve are in contact with each other at the terminal portion of the valve at the downstream end.

Additional embodiments include a suturing sleeve imbedded into the upstream end of the tubular body for suturing the valve to the heart tissue. If desired, a relatively stiff, tubular shroud surrounding the tubular body and attached thereto at the upstream end can be provided.

DESCRIPTION OF THE DRAWINGS

The present invention will be more fully understood from the following description taken in conjunction with the accompanying drawings wherein:

FIGS. 1A and B are vertical and horizontal side cross-sectional views, respectively, of a preferred implantable heart valve according to the invention;

FIG. 2 is a vertical side cross-sectional view of the heart valve of FIG. 1A showing the tubular shroud embodiment;

FIGS. 3A and B are perspective views, partly broken away, showing the heart valve of FIG. 1A in the closed and open positions, respectively; and FIG. 4 is a cross-sectional view of the human heart with heart valves according to the invention implanted therein.

DESCRIPTION

Referring now to the drawing and in particular to FIG. 1, the heart valve of the invention is shown to include a flattened, flexible tubular body 10, an annular spacing member 13 inserted into and opening the upstream end of the tubular body 10. The downstream end of the tubular body 10 forms a flap valve with inner working surfaces that contact each other when the valve is closed and move apart when the valve is open (FIG. 1A and FIGS. 3A and B). The anti-inversion member is shown in the form of a flat, tongue-like separator 12 which is formed with (or carried by) the spacing member 13. The separator 12 extends into the tubular body between the working surfaces at the downstream end of the flap valve such that a portion of the working surfaces contact opposite sides of the separator 12 as shown in FIGS. 1A.

The component parts of the heart valve of the invention are constructed of flexible silicone rubber or other equally suited material which is inert with respect to human blood and tissue. The separator 12 is also preferably made of a silicone rubber or plastic and has a slightly higher degree of stiffness than the more flexible tubular body 10. This also applies to the spacing member 13.

Imbedded in the upstream end of the tubular body 10 is a mesh sleeve 14 which is used for suturing the valve to the heart tissue. The mesh sleeve is preferably made of Dacron but can be of any equally suitable material which is inert to human blood and tissue.

The tubular body 10 can be readily fabricated by molding in the form of a flattened tube which is opened at one end by inserting the annular spacing member 13 as shown in FIG. 1A. The anti-inversion separator 12 does not extend completely through the valve of the invention but is located preferably as shown in the drawing such that the inner working surfaces of the valve contact each other at the terminal portion of the downstream end of the valve when the same is closed. The separator 12 prevents inversion of the valve in the course of being forced closed and also provides for laminer flow through the valve in the open position.

FIG. 3A shows the preferred heart valve of the invention in the closed position and FIG. 3B shows the heart valve of the invention in the open or full flow position. It should be noted that all component parts of the valve of the invention can be molded and fabricated to exact tolerances.

FIG. 3B demonstrates the appearance of the valve when fully open and the pressures that open and hold the valve open during this cycle are shown by the arrows designated P. The heart valve of the invention requires very slight pressures to open along its extended length and therefore no reflected pressures of any magnitude are generated. In FIG. 3A, the action of uniform blood pressure closing the valve securely is indicated by the arrows again designated P.

It should be stressed in particular that the closing pressure of the valve is uniformly distributed over the inner working surfaces of the flap valve and the resulting force between the flap valve working surfaces can never exceed the working blood pressure because the valve working surfaces are exactly equal in area to the surfaces which are operated on externally by the closing blood pressure (FIG. 3A). It should also be stressed that since there is no rubbing or high contact pressures between the operating or working surfaces of the flap valve, the life of the valve of the invention is extremely long. Also avoided is deformation of the working surfaces that can take place in prior art heart valves such as the ball-type valves. For this reason the heart valve of the invention cannot become inoperative prematurely.

It is unlikely that the heart valve of the invention will experience failure, but if this does occur it is expected that it will result from tearing of the tubular body 10 at the folds. If this should occur, the tearing would progress from the outermost or end point of the downstream end of the flap valve towards the open or upstream end of the valve. Should such a progressive tearing begin, the valve would still be operative up until the time that the progressive tearing enters into the permanently opened volume portion of the flap valve. This tearing can be detected, however, long before the valve might become inoperative and the condition corrected.

An alternated embodiment is shown in FIG. 2 wherein the valve of FIG. 1A is shrouded in a cylindrical tube 16 preferably formed of the same type of material as the tubular body 10 but having a stiffness sufficient to resist deformation when implanted in the heart. This type of valve construction would be used instead of the valve shown in FIG. 1 in instances where the surrounding heart tissue may deform the valve mechanism and possibly impede proper opening and closing of the valve.

FIG. 4 illustrates a section through the human heart which has been implanted with valves according to the invention. Both valves are shown in the closed position as if systole is about to begin causing a back pressure on the valves. Note that both valves have been sutured in place after suitable portions of the human valves have been excised. The aortic and pulmonary valves may also be replaced in a similar manner with the flap end of the valve aligned to the blood flow direction.

It should also be noted that the mesh sleeve 14 which is imbedded into the open or upstream end of the valve is used for suturing the valve to the heart tissue. This mesh sleeve will eventually become enveloped and imbedded in the heart tissue making it an integral part of the heart. The valve of the invention, made of silicone rubber or plastic or other suitable inert material, will not support any fibrin or tissue formation thereby assuring unimpeded operation of the valve.

What is claimed is:

1. Heart valve comprising:
   a. a flattened, flexible tubular body;
   b. spacing means inserted into and opening the upstream end of said tubular body, the downstream end of said tubular body forming a flap valve with inner working surfaces that contact each other when the valve is closed and move apart when the valve is open;
   c. a centrally positioned, flat, tongue-like anti-inversion member carried by said spacing means and extending into the tubular body between the working surfaces thereof, a portion of said working surfaces contacting said anti-inversion member when the valve is closed and the remaining portion of said working surfaces contacting each other around said anti-inversion member when the valve is closed; and
   d. an annular mesh sleeve embedded in the upstream end of said tubular body for suturing the valve to the heart tissue.

2. Heart valve of claim 1 wherein said spacing means is an annular member inserted into and opening the upstream end of said tubular body.

3. Heart valve of claim 1 wherein said tongue-like member decreases in width towards the downstream end of said tubular body.

4. Heart valve of claim 1 wherein said tongue-like member terminates short of the downstream end of said tubular body.

5. Heart valve of claim 1 provided with a relatively stiff, tubular shroud surrounding said tubular body and attached thereto at the upstream end.

* * * * *